Feb. 3, 1970

C. J. KOLTKAMP 3,493,919

BAR STOCK BLADE TERMINAL

Filed July 31, 1967

INVENTOR
Calvin J. Holtkamp
BY
Ralph T. French
ATTORNEY

United States Patent Office 3,493,919
Patented Feb. 3, 1970

3,493,919
BAR STOCK BLADE TERMINAL
Calvin J. Holtkamp, Mansfield, Ohio, assignor to Westinghouse Electric Corporation, Pittsburgh, Pa., a corporation of Pennsylvania
Filed July 31, 1967, Ser. No. 657,124
Int. Cl. H01r 9/14, 13/24, 13/50
U.S. Cl. 339—214                    1 Claim

ABSTRACT OF THE DISCLOSURE

A simple terminal that can be incorporated as an end portion of any item that can be made from rod or bar stock on an automatic screw machine. A rod is machined to provide a head at one end thereof which constitutes a terminal blade adapted to receive a spring-biased push-on receptacle, the head being spaced from a base portion to provide a clearance slot for reception of the flanges of the push-on receptacle.

BACKGROUND OF THE INVENTION

Electrical terminals consisting of flat metal tabs, and spring-biased receptacles which are pushed on such tabs are widely used for electrical connections in the appliance field. The usual push-on receptacles were developed to be pushed on flat metal tabs which were 1/32 inch thick, 1/4 inch wide and 5/16 inch long. This type of electrical connection is fast and inexpensive and is often more satisfactory than a screw type connection.

A disadvantage of this type of connection is the high tool cost of the dies to make the tabs. To properly shape a tab for use with a push-on receptacle, it is usually necessary to blank, coin and trim the tab. The tool cost is a large factor where production is small, and this type of connection is not used in many low volume devices because of the tool costs.

The present invention provides a simple terminal that can be incorporated as an end portion of any item that can be made from rod or bar stock on an automatic screw machine.

SUMMARY OF THE INVENTION

In one embodiment of the invention, the terminal consists of a rod-like extension of an electrically conductive member, having a head portion formed as a blade which is adapted to receive a spring-biased push-on receptacle. In another embodiment of the invention, the terminal consists of a rod having a head at one end which is formed as a blade which is adapted to receive a spring-biased push-on receptacle, and having a base spaced from the blade to provide a clearance slot for the flange of the push-on receptacle, and for a cover, if used, and having its other end extending from the base and forming the attachment portion of the rod. This attachment portion can take the form of a solid or hollow rivet shank, or a solid or hollow screw shank, with said shank being either larger, smaller or similar in diameter relative to the base. The length and shape of the shank may vary to suit the particular application, and can be reduced to a welding emboss where attachment by welding is desired.

The size and shape of the blade can be varied to conform with different sized and shaped push-on receptacles, and the size and shape of the base can be varied to fit into such recesses as are provided in the insulating walls. New cutters for different contours and new collets for different thicknesses, are relatively inexpensive.

Thus, it will be apparent that a feature of this invention is the combination of an electrical terminal for a push-on receptacle with an electrically conductive part that is manufacturable in an automatic screw machine.

DRAWING DESCRIPTION

Figure 1:
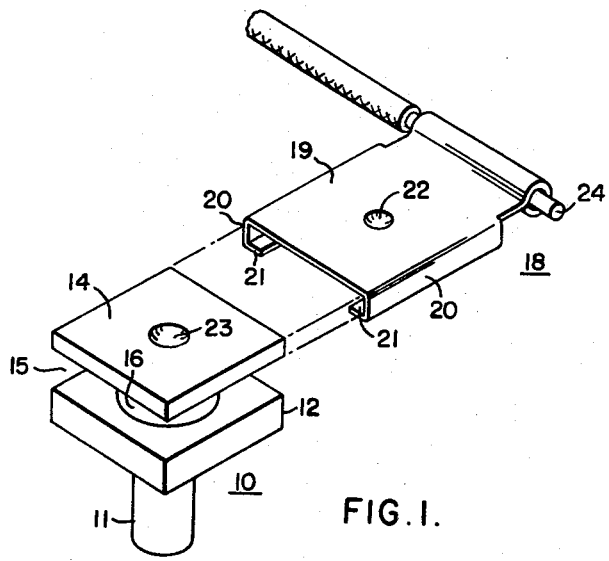
FIGURE 1 is a perspective view of a terminal embodying this invention, and of a push-on receptacle used with the terminal, but shown spaced from the terminal.

Referring to FIGURE 1 of the drawings, a square rod 10 of suitable electrically conductive material has a cylindrical shank 11 and has a square base 12 above the lower end of the shank 11. The base 12 has upper and lower sides extending normal to the axis of the shank 11, and with their centers on the shank axis. The rod 10 has a terminal end formed as a square blade 14 on its upper end, and spaced from the base 12 to form a clearance space slot 15. The blade 14 has flat upper and lower sides, the same sizes as and extending parallel to, the upper and lower sides of the base 12, and the centers of the upper and lower sides of the blade are on the axis of the shank 11. The rod body 16 between the blade 14 and the base 12 is cylindrical, and has a diameter which is smaller than the distance between the two side flanges 21 of a push-on receptacle 18.

The push-on receptacle 18, of spring metal, has a flat top wall 19 and has flat side walls 20, the inner surfaces of which are spaced apart a distance slightly greater than the width of the blade, and the lower ends of which are turned inwardly normal to the sides 20 to form slide flanges 21. The inner surfaces of the flanges are spaced from the center of the wall 19 a distance slightly less than the thickness of the blade. The portion of the wall 19 between the slots thus has to flex outwardly when the receptacle is pushed on the blade, thus providing spring contact bias. The center of the wall 19 has an inwardly-extending dimple 22 formed in about its center, which is adapted to snap into a complementary recess 21 in the center of the upper side of the blade 14 when the receptacle 18 has been pushed fully onto the blade 14. The outer end of the wall 19 is rolled over and soldered to an electrical conductor 24.

Figure 3:
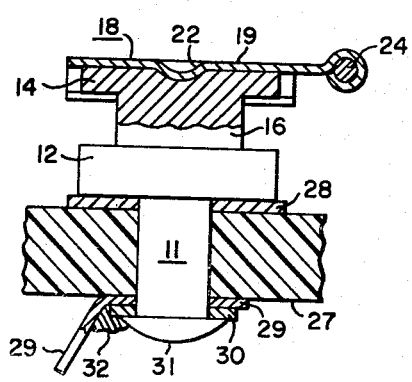
FIG. 3 is an enlarged side view, partially in section, of a terminal assembly embodying this invention.

As shown by FIG. 3 of the drawings, a terminal assembly is formed by placing the rod shank 11 through a circular opening in a base 27 of electrical insulation with a terminal lug 29 and a washer 30 between the other side of the base 27 and a rivet head 31 formed on the outer end of the rod shaft 11. The rivet head 31 will be formed in the usual manner by applying a riveting machine to the end of the rod shank 11 while applying opposing pressure to the blade 14.

Figure 2:
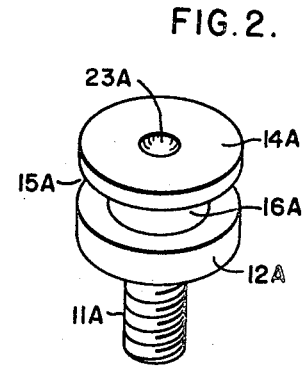
FIG. 2 is a perspective view of another terminal embodying the invention, with a screw shank as opposed to the rod shank shown in FIG. 1.

FIG. 2 of the drawings shows a rod having a shank 11a similar to the rod shank of FIG. 1, except that it is threaded and has a circular blade 14a instead of a square one, and a circular base 12a instead of a square base, and having a circular space 15a around the rod body 16a between the blade 14a and the base 12a. The blade 15a has a recess 23a for the dimple of a push-on receptacle.

Other differently shaped rods could be used. For example, a rod could have a rectangular blade, and a round base which could be fitted in a circular recess, or could have a round or elliptical blade and a rectangular base which could be fitted in a rectangular recess.

Figure 4:
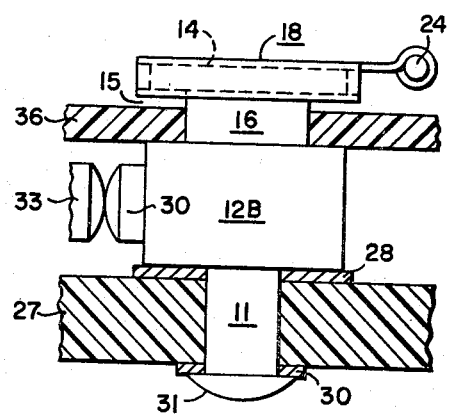
FIG. 4 is an enlarged side view, partially in section, of another terminal assembly embodying this invention.

As shown in FIG. 4 of the drawings, a rod similar to the one of FIG. 1 except for the thickness of its base, has a base 12a which is thicker than the base 12, for providing a base thick enough to have a contact stud 30 welded thereto. Another spring-biased contact stud 33 is urged against the stud 30 for providing the conductor connection to the rod which is provided by the lug 29 of FIG. 3. In FIG. 4, the lug 29 is omitted and the insulating cover 36 could be placed around the rod body 16 in the clearance space 15.

Figure 5:
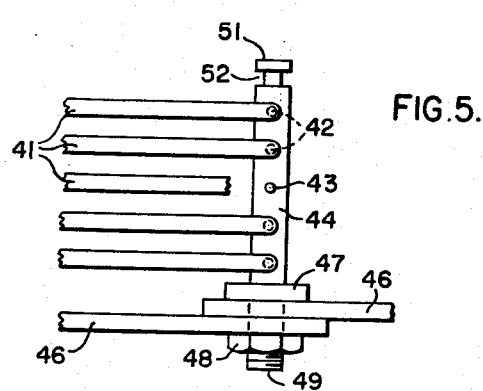
FIG. 5 is an elevational view of a terminal embodying the invention as applied to the rod portion of an electrically conductive member.

Another application of the invention is shown in FIG. 5, where a plurality of cam-actuated contact-carrying spring arms 41 are supported at their left-hand ends (as viewed in this figure) in juxtaposed relation to a corresponding number of cams (not shown), such as are conventional in multicam timers. The free right-hand end portion of each arm 41 carries on its under surface a contact 42 adapted to engage a similar contact 43, one of several carried by a metal stud 44. The stud 44 may be mounted on one or more plates 46 and may serve to hold such plates together by clamping such plates between a shoulder 47 on the stud and a nut 48 on the threaded terminal portion 49 of the stud.

The upper free end of the stud 44 is machined to provide the circular terminal 51 above the clearance space 52 in accordance with the present invention.

In use, a push-on receptacle (such as shown in FIGS. 1, 3 and 4), connected to an electrical power source, would be pushed onto the terminal 51 and the left-hand ends of the spring arms 41 would be connected into various electrical circuits, in the usual manner.

What is claimed is:

1. The combination of an insulating supporting wall and a one-piece electrical terminal comprising a metal rivet having a longitudinal axis and having a head at one end formed as a blade for receiving a push-on receptacle having an inwardly extending dimple in its outer wall, said blade having generally flat inner and outer surfaces extending in spaced-apart planes normal to said axis, said blade having a recess extending inwardly from said outer surface and formed to receive a complementary dimple in a separate associated push-on receptacle, said rivet having a base spaced from said blade, said base having generally flat inner and outer surfaces extending in spaced-apart planes normal to said axis, said rivet between said blade and base having a body portion of smaller transverse dimensions than corresponding dimensions of said blade and base, said rivet being formed between said base and its other end as a cylindrical rivet shank having a diameter less than any transverse dimension of said base, said shank being received by said support wall of electrical insulating material having flat inner and outer surfaces extending in spaced-apart planes normal to said axis, said rivet cylindrical shank extending through said wall with said base at the said inner side of said wall, a formed head on said other end of said rivet shank at said outer side of said wall, and means independent of said receptacle for making electrical contact with said rivet.

References Cited

UNITED STATES PATENTS

| 1,291,545 | 1/1919 | Keim | 339—258 |
| 2,056,036 | 9/1936 | Catron et al. | 339—220 X |
| 3,148,012 | 9/1964 | Patton | 339—256 |

FOREIGN PATENTS 533,031   11/1958   Canada.

RICHARD E. MOORE, Primary Examiner

U.S. Cl. X.R.

339—220, 258